Figure 2:
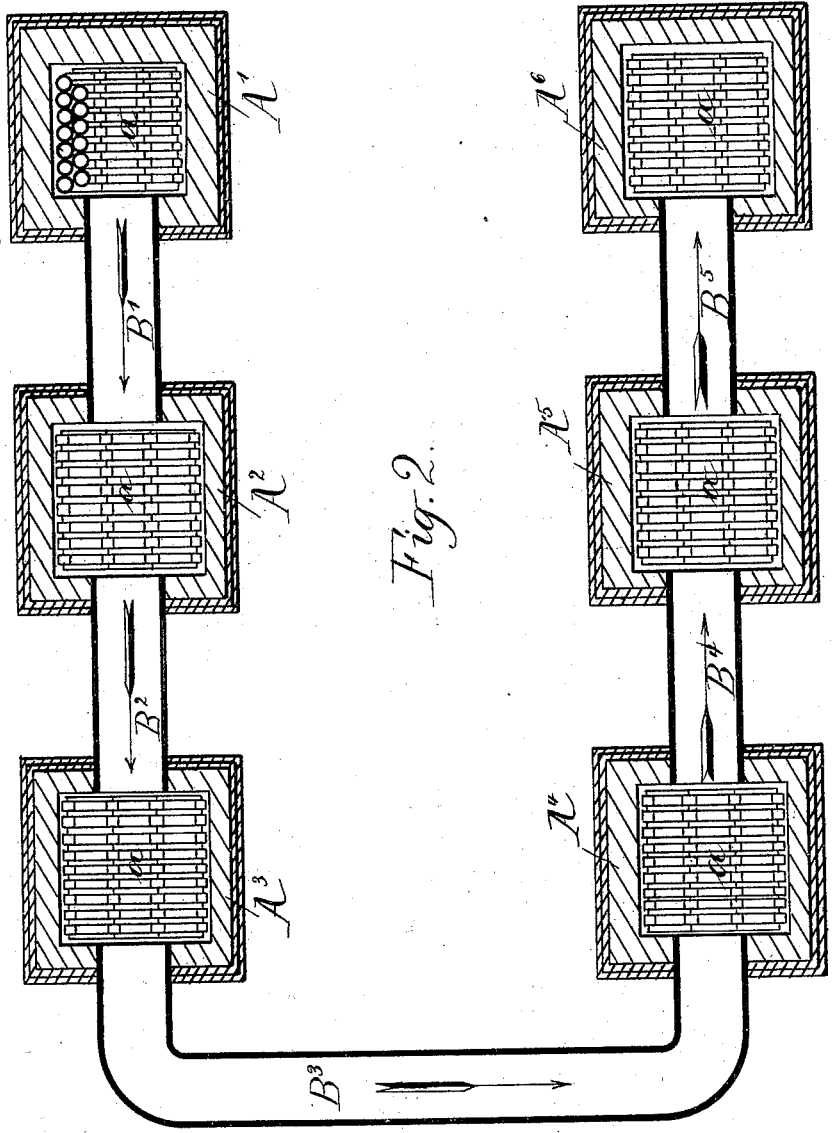

(No Model.) 5 Sheets—Sheet 1.
A. STAUB.
APPARATUS FOR MAKING SULFURIC ACID.
No. 598,351. Patented Feb. 1, 1898.
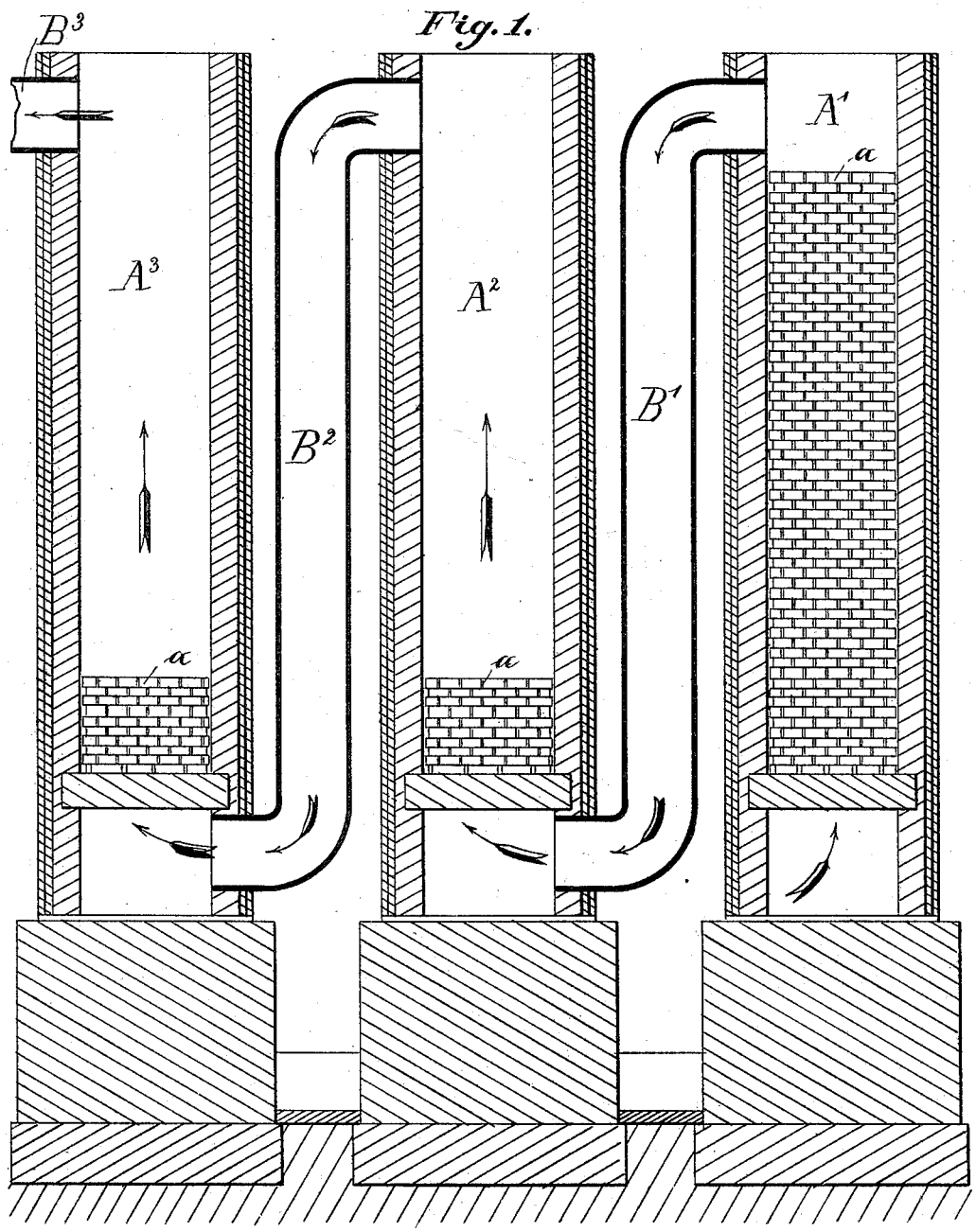

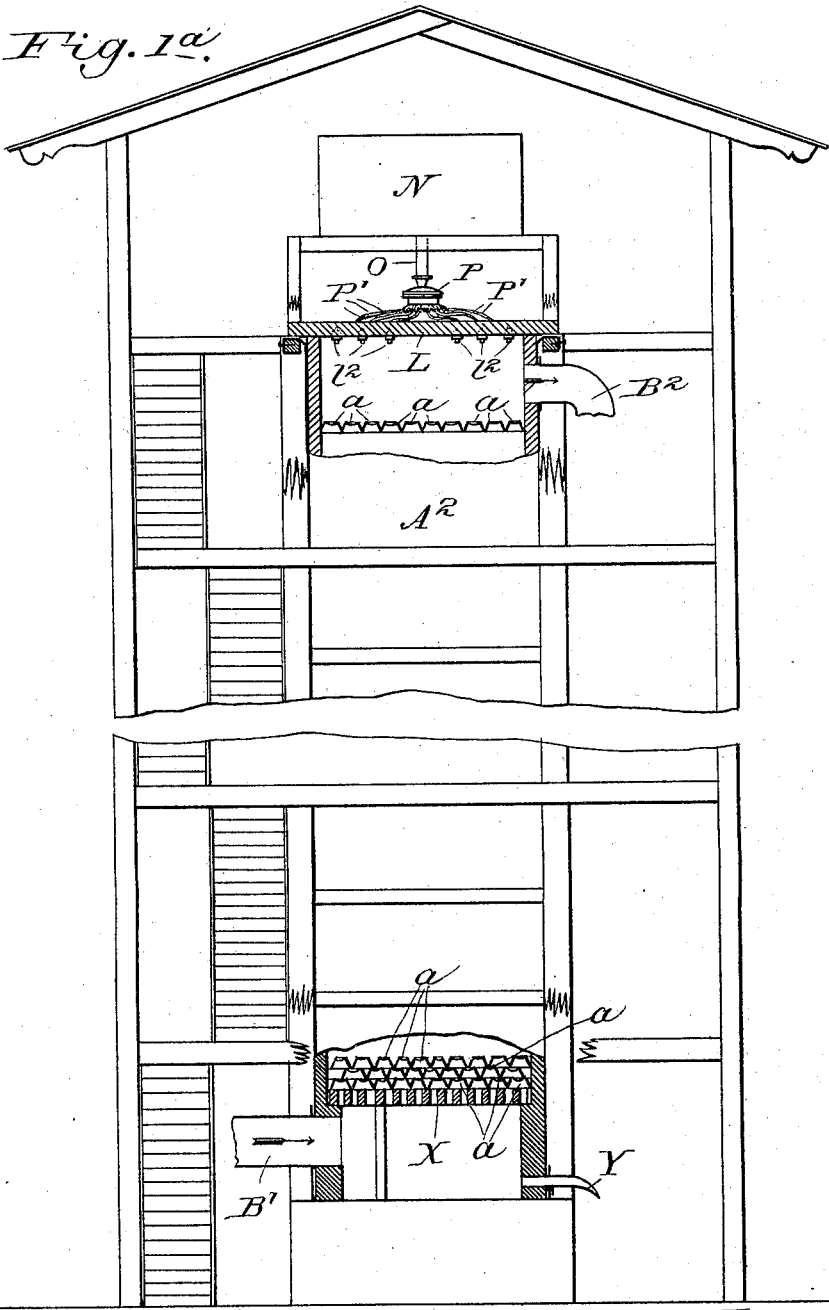

(No Model.) 5 Sheets—Sheet 3.

A. STAUB.
APPARATUS FOR MAKING SULFURIC ACID.

No. 598,351. Patented Feb. 1, 1898.

(No Model.) 5 Sheets—Sheet 4.
A. STAUB.
APPARATUS FOR MAKING SULFURIC ACID.
No. 598,351. Patented Feb. 1, 1898.
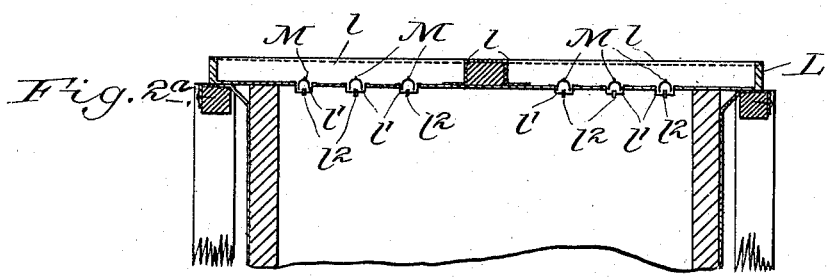
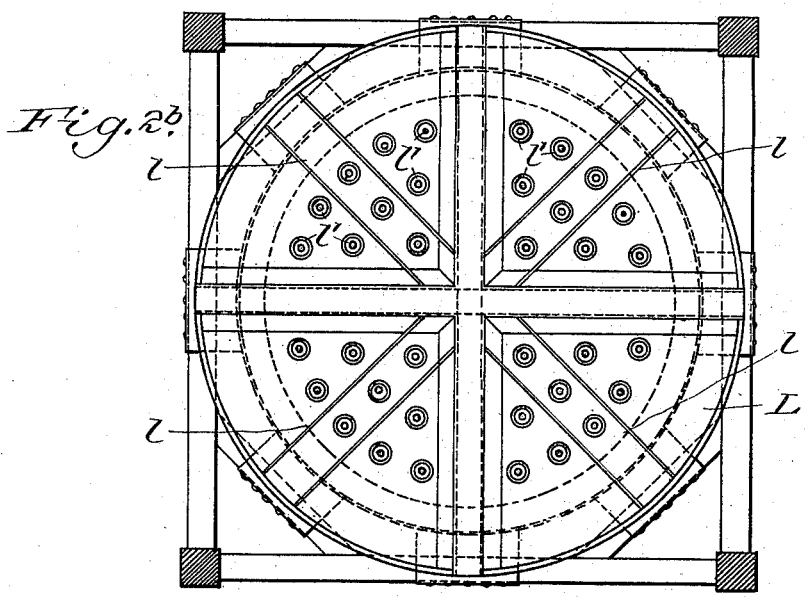
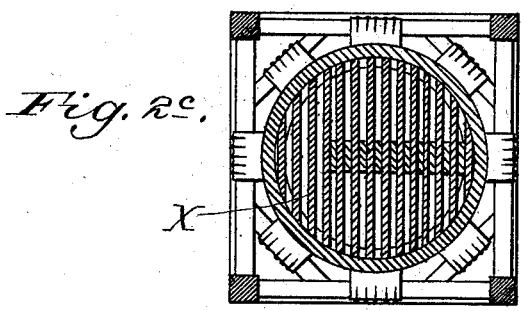
Witnesses,
Inventor,
Alfred Staub
By Knight Bros.
Attorneys.

(No Model.) 5 Sheets—Sheet 5.
A. STAUB.
APPARATUS FOR MAKING SULFURIC ACID.
No. 598,351. Patented Feb. 1, 1898.
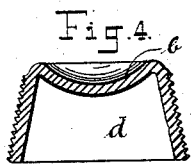
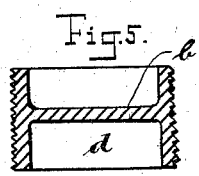
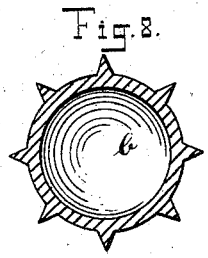
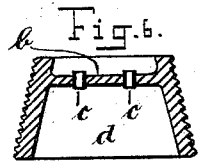
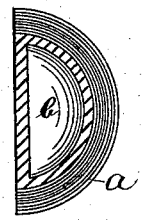
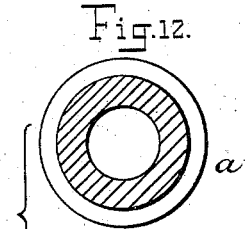
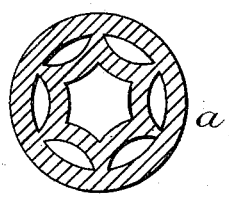
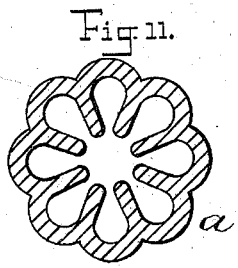
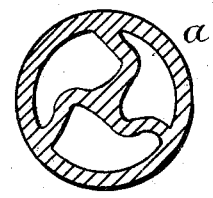
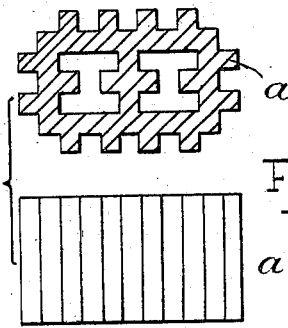
Witnesses
M. V. Bidgood
J. Green
Inventor
Alfred Staub
By [signature]
Attys

UNITED STATES PATENT OFFICE.

ALFRED STAUB, OF BETTENHAUSEN, GERMANY.

APPARATUS FOR MAKING SULFURIC ACID.

SPECIFICATION forming part of Letters Patent No. 598,351, dated February 1, 1898.

Application filed January 16, 1896. Serial No. 575,681. (No model.) Patented in France December 30, 1892, No. 226,718; in Germany May 30, 1894, No. 4,157; in England June 29, 1894, No. 12,675; in Spain January 4, 1896, No. 18,504; in Russia January 4, 1896, No. 25,977, and in Sweden January 8, 1896, No. 12.

*To all whom it may concern:*

Be it known that I, ALFRED STAUB, a citizen of the Republic of Switzerland, residing at Bettenhausen, in the Province of Hesse-Nassau, Germany, have invented certain new and useful Improvements in Apparatus for Producing Sulfuric Acid, (for which I have obtained Letters Patent in France, No. 226,718, dated December 30, 1892; in Germany, No. T 4,157, IV 75, dated May 30, 1894; in England, No. 12,675, dated June 29, 1894; in Spain, No. 18,504, dated January 4, 1896; in Russia, No. 25,977, dated January 4, 1896, and in Sweden, No. 12, dated January 8, 1896,) of which the following is a specification.

The objects of my improved apparatus are the production of sulfuric acid in a cheaper and more effectual manner, obviating the necessity of using the lead pans now commonly employed and utilizing all of the sulfurous fumes from the furnace, producing acids of different degrees of concentration.

To this end I provide a series of towers completely filled with acid-resisting bodies of special form, as hereinafter described, said towers communicating with each other through suitable tubes or passages leading from the top of one tower to the bottom of the next, and so on. The sulfurous-acid fumes or gas coming from the furnace are mixed with air and admitted to the bottom of the first tower, where they rise slowly through the stack of acid-resisting bodies, meeting in their upward course the nitrated sulfuric acid, sulfuric acid, and water, which are supplied at the top of the tower and trickle down through the crevices between the acid-resisting bodies. The sulfurous fumes are oxidized by the trickling acid more or less, causing a concentration of the acid. The fumes are passed from the top of the first tower through the tube or passage leading to the bottom of the second tower of the series, where they rise slowly through a second stack of acid-resisting bodies over which a weaker acid or water containing nitric acid is constantly trickling down, oxidizing more of the sulfurous-acid fumes and forming a weak sulfuric acid. The fumes are in this manner passed through the entire series of towers until the strength is spent, in consequence of which the gas is reacting all through the apparatus, producing acid of different degrees of concentration, and no open chambers or other arrangement of any sort are necessary to cause the gas to mix and lessen its rapidity of motion.

The feeding of the compartments or towers is so arranged that the hyponitrated sulfuric acid tricklingd own through the acid-resisting bodies will always oxidize the excess of sulfurous acid in the fumes from the furnace as long as there is an excess, so that in this way the acid in the first compartment constantly concentrates itself. This concentration is effected by the combination of the water with the sulfuric anhydrid formed by the oxidation of the sulfurous-acid gas. The formation of the weaker acids in the remaining compartments then continues, as explained. The nitric acid can be supplied at any suitable place in the apparatus as requirements may demand.

If the nitrous acid should predominate in the gas mixture which passes from the first tower or compartment into the bottom of the second tower, the stack of acid-resisting bodies should be irrigated with the sulfuric acid being formed, which will bring into reaction the remaining excess of sulfurous acid and form new sulfuric acid, which strengthens the acid which is trickling over the acid-resisting bodies and enables it to retain any excess of hyponitrous acid. The concentration of the sulfurous-acid fumes continues through the several towers or compartments, producing acids of different degrees of concentration.

I find I can reduce the number of towers required for satisfactorily utilizing all of the sulfurous-acid fumes by admitting steam to the towers at any suitable point or points.

With my improved apparatus the towers must be completely filled with the acid-resisting bodies in order that the molecules of gas will be brought together as closely as possible and will move upwardly through the towers very slowly. The acid-resisting bodies are formed, preferably, of earthenware—namely, a densely-burned earthenware for the first tower and a brown-glazed earthenware for the other towers, all of said bodies thus being non-porous.

I find that by my apparatus the development of heat is much less than usual and the volume of the gas is smaller and the concentration and formation of the sulfuric acid are quicker.

In order that my invention may be fully understood, I will first describe the same with reference to the accompanying drawings and then point out the novelty with more particularity in the annexed claims.

In said drawings, Figure 1 is a vertical sectional elevation of part of a plant constructed according to my invention, showing three towers of a series, the tops of the towers being omitted. Fig. 1$^a$ is a side elevation, partly broken away, of one of the towers, showing the means for supplying the water or weak acid at top. Fig. 2 is a sectional plan representation of a plant formed with six communicating towers. Fig. 2$^a$ is a detail vertical sectional view of the top portion of a tower. Fig. 2$^b$ is a plan view of the top portion of one of the towers, showing the framework in section. Fig. 2$^c$ is a transverse sectional view of the bottom portion of one of the towers, showing the grating which supports the acid-resisting bodies. Figs. 3 to 12 are detail views of various forms of acid-resisting bodies adapted to be stacked or piled up in the towers of my improved plant.

I have represented a plant composed of six absorption-towers; but I would have it understood that my invention applies equally as well to a series of a smaller or larger number of towers.

A', A$^2$, A$^3$, A$^4$, A$^5$, and A$^6$ represent the towers. The adjacent towers communicate with each other through tubes or passages B', B$^2$, B$^3$, B$^4$, and B$^5$, respectively, which tubes or passages lead from the top of one tower into the bottom of the next succeeding tower, and so on through the series. Each tower is completely filled with a stack or pile of small acid-resisting bodies $a$, (formed, preferably, of an acid-proof mixture of clay and fire-clay,) which provide crevices or spaces between them to allow the upward flow of the sulfurous-acid gas or fumes and the downward flow of the nitrated sulfuric acid and water. These acid-resisting bodies $a$ are supported by the grates X, located in the towers adjacent to their lower ends above the entrance of the passages B' B$^2$, &c.

Y is a suitable outlet-spout or gate for the outlet of the acid from the bottom of each tower.

Each tower is closed at top by a leaden cover L in the shape of a shallow vessel which has radial walls $l$, dividing it into a number of chambers. In the bottom of the cover L are formed cup-shaped recesses $l'$, (three in each chamber,) having short open-ended tubes $l^2$ passing through the bottom and communicating with the interior of the tower extending about three centimeters above and below the bottom of the recess. Suspended in each of the recesses $l'$ over the upper open ends of the tubes $l^2$ is a bell or hood M, which with the upper end of the tube forms a liquid seal in the recess. Supported above the cover L is a tank N for holding acid and water. O is a supply-pipe leading from said tank to a distributing-chamber P, from which extend the pipes P', leading to the several chambers of the cover. The tank N, pipe O, distributer P, and pipes P' are all made of lead. By this means the acid and water are supplied to the cover, from which they flow in small streams through the several pipes $l^2$, the liquid seals preventing the escape of any gases into the cover.

The gas or fumes from the sulfur or quartz furnace is mixed with a sufficient quantity of air and led to the lower end of the first tower A', where it presses upward through the crevices or spaces between the small bodies $a$ $a$, causing the molecules to be brought very closely together, whereby the chemical reaction is more easily accomplished. In any suitable manner the sulfuric acid which is to be strengthened is fed into the first tower from above, together with a sufficient quantity of water. Such nitric acid as it becomes necessary is also introduced at top or any other suitable place in the tower. The gas ascending slowly through the tower meets the combined nitric and sulfuric acid and water, which trickles down around the acid-resisting bodies and is decomposed by the action of the acid, forming new sulfuric acid, whose strength is added to that of the acid fed in at the top of the tower. When the mixture of sulfurous-acid gas has reached the upper part of the tower A', it passes downwardly through the tube B' and enters at the bottom of the second tower A$^2$, where it presses slowly upward through the stack of acid-resisting bodies $a$ $a$ in said second tower. To the second tower is fed in at the top a suitable supply of water or weak acid, according to the requirements which have been referred to above and are well understood in the art. In like manner the gas is passed through all of the succeeding towers, where it comes in contact with water which is supplied to the towers. In this manner it will be observed that the acid of greatest concentration and greatest specific gravity will be produced in the first tower A' and the next strongest acid in the tower A$^2$, and so on.

It is of the greatest importance that the towers should be completely filled with the stacks of acid-resisting bodies, which bodies should be of such shape as to give the greatest possible area of surface for exposing the gas to the action of the acid and water. In Figs. 3 to 12 I have shown various forms of such bodies which I have found prove very satisfactory for this purpose. Said bodies preferably have open depressions or inverted cups on their under sides, as shown in Figs.

4, 5, and 6, so as to produce return movements in the gas flowing past them and cause it to move slowly, thus subjecting it more fully to the action of the liquid. The inner or outer surface is fitted with windings, crinkles, laps, grooves, edges, joint-pieces, stings, indentations, partition-walls, bridges of any sort, round or straight, &c. They can be used vertically, straight, slantingly, horizontally, looking upward or downward. The principal pipes can also be fitted with one or several tubes in the interior. Figs. 3, 9, 10, 11, and 12 show such forms. Likewise bodies with a cup $b$ at the top can be used, (see Figs. 4, 5, 6, 7, and 8,) which gathers the liquid that trickles down over the sides. This shell can be fitted with a trickling device or with tubes $c$, Fig. 6. The longitudinal and cross sections and forms of those bodies can, as for the above-stated, be chosen at will. For filling out the corners of the towers the section of the bodies is so chosen that it represents the above-stated formations cut through. Fig. 7 shows such a corner-body. Owing to the hollow space $d$ within the bodies, Figs. 4, 5, and 6, the gas is obliged to slow its pace. The shells catch part of the liquid that trickles down, so that in the towers there is constantly a certain quantity of liquid stored up and a perfectly even overflowing of the liquid is obtained.

Having thus described my invention, what I claim, and desire to secure by Letters Patent, is—

1. An apparatus for the manufacture of sulfuric acid, consisting of a series of towers, the top of each tower being connected to the bottom of the next tower in the series, means for passing sulfurous-acid gas and air through said towers in series, means for feeding nitrated sulfuric acid and water into the said towers at the upper ends thereof, and acid-resisting bodies filling said towers and having open depressions on the under sides thereof whereby the gases ascending in said towers are given return movements.

2. In an apparatus for producing sulfuric acid, the combination of a tower with a stack of acid-resisting bodies formed with liquid-receiving cups and exterior projections and indentations, as set forth.

3. In an apparatus for producing sulfuric acid, the combination of a tower with a stack of acid-resisting bodies each formed with a liquid-receiving cup, tubes $c$ passing through the bottom of said cup, and exterior projections and indentations, as set forth.

4. In an apparatus for producing sulfuric acid, the combination of a tower with a stack of acid-resisting bodies each formed with an inverted cup or open depression on the under side thereof to accumulate and turn back the ascending gases.

5. In an apparatus for producing sulfuric acid, the combination of a tower with a stack of acid-resisting bodies each formed with a liquid-receiving cup in the upper side, and an inverted cup or open depression on the under side, to turn back the ascending gases.

In testimony whereof I have signed my name to this specification in the presence of two subscribing witnesses.

ALFRED STAUB. [L. S.]

Witnesses:
H. BROMEIS,
CHRISTIAN DUX.